United States Patent [19]

Trema

[11] Patent Number: 4,785,905
[45] Date of Patent: Nov. 22, 1988

[54] SUSPENSION DEVICE FOR A MOTORCYCLE FRONT WHEEL

[75] Inventor: Daniel Trema, Bezons, France
[73] Assignee: Elf France, Courbevoie, France
[21] Appl. No.: 945,039
[22] Filed: Dec. 22, 1986

[30] Foreign Application Priority Data

Dec. 27, 1985 [FR] France .................... 85 19306
Feb. 21, 1986 [FR] France .................... 86 02394

[51] Int. Cl.⁴ .............. B62K 25/04; B62K 21/02; B62K 21/10
[52] U.S. Cl. .................... 180/219; 280/275
[58] Field of Search ........... 280/275, 276, 277, 279, 280/281 R, 283, 286; 180/219, 227

[56] References Cited

U.S. PATENT DOCUMENTS

| | | | |
|---|---|---|---|
| 4,179,135 | 12/1979 | Slater | 280/276 |
| 4,526,249 | 7/1985 | Parker | 280/275 |
| 4,638,881 | 1/1987 | Morioka | 180/219 |

FOREIGN PATENT DOCUMENTS 1466061  3/1977  United Kingdom ........... 280/276

Primary Examiner—John J. Love
Assistant Examiner—Everett G. Diederiks, Jr.
Attorney, Agent, or Firm—Burgess, Ryan & Wayne

[57] ABSTRACT

Front suspension device comprising a lateral arm, for supporting and steering a front wheel of a motorcycle, wherein the lateral arm is connected at its upper end to a suspension and/or shock absorbing block with telescopic cylinder of which the external movable rod is articulated at its end on an axis orthogonal to the median longitudinal plane of the motorcycle, the arm comprising in the lower part a ball and socket articulation support of which the center of pivoting is located substantially in the alignment of steering axis and cooperates with a connection arm rotationally mounted on an axle of the chassis perpendicular to the median plane of the motorcycle.

8 Claims, 4 Drawing Sheets

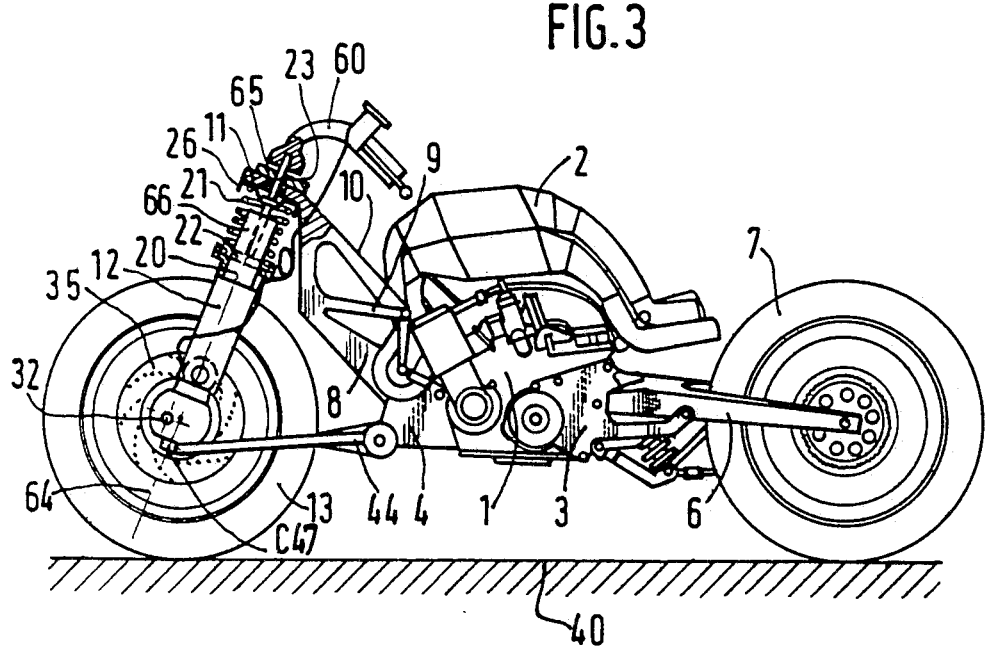

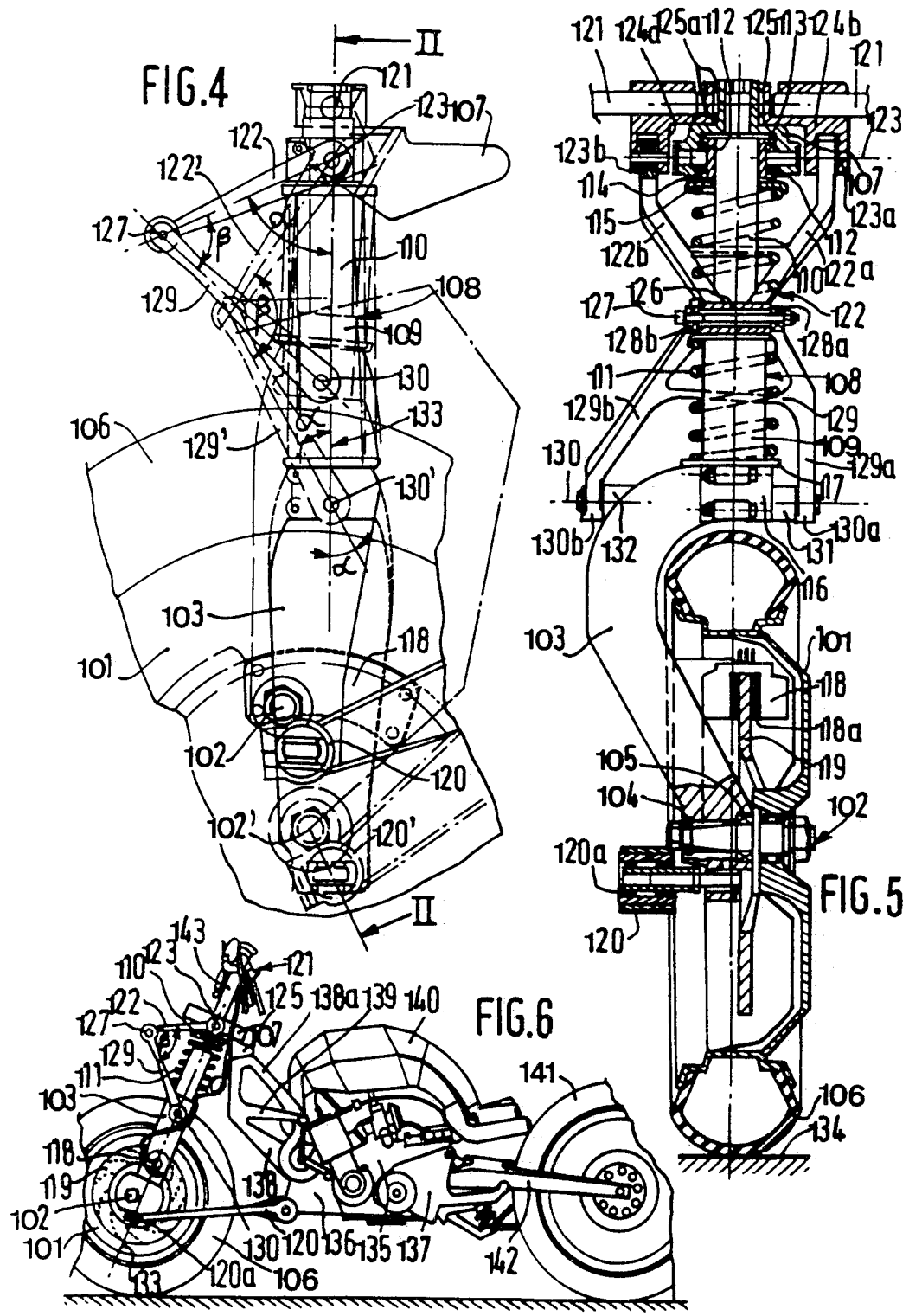

SUSPENSION DEVICE FOR A MOTORCYCLE FRONT WHEEL

BACKGROUND OF THE INVENTION

Field of the invention

The present invention concerns a front suspension device comprising a lateral arm device, for supporting and steering a motorcycle front wheel, the said arm being adapted to turn about a steering axis which is substantially orthogonal to that of the wheel and which is located substantially in the median longitudinal plane of the motorcycle.

The suspension of a body or a chassis of a vehicle on a steering wheel should, in order to maintain correct riding qualities for this vehicle, be independent from that of the other wheel(s) but this requirement means that the connections between said wheel and the suspension means are consequently much more complex. A considerable simplification was brought to suspensions cooperating with vehicle front wheels in the type of suspension called Mac Pherson suspension and described, for example, in French patent No. 1 156 145. In this type of suspension, which has since been improved, the spindle of the front wheel is carried by a shock absorber tube connected by a link hinged to the central part of the chassis and the vehicle body rests, while extruding from a relatively high bearing position, directly on a helical spring interposed between a bearing shoulder of the shock absorber tube and a bearing plate of the body.

This front suspension structure, that has since revealed to be so compact and economic that a large number of automobiles built throughout the world have been equipped with it, has never however been successfully applied to motorcycles the front wheel of which must be maintained in an accurately centered manner in the symmetry plane of the wheel, contrarily to four-wheel automobiles which can easily tolerate a cantilevered mounting of the wheel spindle.

One of the objects of the present invention is thus to provide an advantageous application to motorcycles and similar vehicles of the "Mac Pherson" type suspension in order to produce a motorcycle front suspension which is more compact, more efficient, more economic and in ge results in an improved road holding and aesthetic properties of such motorcycles and other two-wheel or three-wheel vehicles and single wheel vehicles.

With this object, the lateral arm is connected at its upper end to a suspension and/or shock absorbing block having a telescopic cylinder structure, the internal movable rod of which is hinged at its high end onto a front peak of the chassis of the vehicle, said lateral arm comprising, on the one hand, a "C"-shpped part which encases a portion of the cross-section of the periphery of the wheel and, on the other hand, a lowe carrying the axle of the wheel and which is provided with a ball and socket articulation of which the center of rotation is located substantially in alignment with the steering axle and which cooperates with an associated ball and socket articulation piece mounted at the end of a connecting arm which is in turn rotatively mounted on an axis of the chassis of the motor cycle perpendicularly to the median plane of the motorcycle, in order to ensure lateral guiding of the lateral arm.

According to a first embodiment of the invention, the "C"-shaped part of the lateral arm is connected by a ball and socket articulation to a steering link adapted angularly to orientate the wheel by rotation of the support arm and of the telescopic block the movable rod of which is integral in rotation with the front peak of the chassis, so as to be subjected to the frictional torque exerted by the relative rotation of the telescopic block with respect to the movable rod and to an associated shock absorbing piston or similar associated elements rotationally integral therewith.

According to another embodiment of the steering control means the movable rod is axially supported on the front peak of the chassis of the motorcycle through which it extends so as to be free to rotate therein, while being axially movable inside the telescopic block with which it is integral in rotation, that part of the said movable rod which extends above the front peak being rendered integral with a handlebar provided with two handles for the direct steering control of the front wheel.

The support arm advantageously comprises adjacent to the axle of the wheel an extension directed towards the rim of the wheel and the telescopic block and on which is fixed by appropriate means, such as screws, at least one brake disk yoke surrounding a brake disk rendered integral at least in rotation with the rotating axle of the wheel.

According to another embodiment concerning the rotatively members, the axle of the wheel is rotatively mounted inside the support arm through the intermediary of at least one bearing axially immobilized by stop means in a bore of the support arm and protruding from the side opposite the support arm by a grooved or equivalent attachment part adapted to be rendered integral in rotation with the brake disk and the rim of the front wheel, this attachment part being extended by a threaded part receiving a rapid tightening nut fixing the wheel and the brake disk, so as to allow rapid changing of the front wheel and, where necessary, of the brake disk after shifting of the disk brake yoke(s).

According to yet a further embodiment, the ball and socket joint support which cooperates with the connecting arm is constituted by a lower axle integral with the support arm and protruding in the steering of the rolling path of the front wheel, its axis being placed substantially in the median plane of the front wheel, a ring or ball body being disposed on this lower axle and hinged on the associated end of the connecting arm, at least the rod and a part of the ring or ball body of the associated end of the connecting arm being housed inside the cup of the brake disk.

According to one feature of the invention, ensuring improved guiding, the external movable rod of the telescopic cylinder structure is hinged onto the front peak of the chassis of the motorcycle through the intermediary of a rod the axis of which is orthogonal to the median plane of the motorcycle and which is integral with the front peak and is rotationally mounted in a boring provided in an articulation head connected, possibly in an adjustable manner, to the movable rod.

According to one advantageous embodiment, the associated ball and socket articulation piece is adjustably mounted at the end of the connecting arm so as to allow adjustment of the "rake" of the front wheel of the motorcycle. This adjustable connection between the end of the connecting arm and the associated ball and socket articulation piece can be a sliding connection controlled by a jack servo-controlled by means reacting to the speed of the motorcycle, so as to cause to vary the rake of the front wheel as a function of said speed.

According to another embodiment, the suspension and shock absorbing block comprises a helical spring having a generally cylindrical or frustoconical form and the longitudinal axis of which, while being substantially located in the median plane of the motorcycle is off-centered with respect to the axis of the telescopic cylinder structure due to its off-centered position with respect to said axis of at least one of the resting cups or plates cooperating with the end of this spring, so as to apply on the lateral arm a return torque towards the straight line position.

The present invention further applies to a device comprising a lateral front suspension arm for supporting and steering a wheel and to a steering control device associated thereto, especially for a motorcycle front wheel carried by at least one support arm connected at its upper end to a suspension and/or shock-absorbing block the external movable rod of which is articulated at its end on a front peak of the chassis of the motorcycle comprising the above front suspension device.

It has already been proposed to produce a motorcycle front suspension comprising a single support arm of the front wheel which is mounted cantilevered on this arm and wherein a suspension spring is interposed between a front peak of the motorcycle chassis and the support arm by means of a movable rod of a suspension arm which is pivotally mounted on this peak. These motorcycle suspensions of the Mac Pherson type give rise to a problem regarding the connection between the steering handlebar and the single support arm of the front wheel.

In order to ensure the connection between the single support arm and the handlebar, it has been proposed to use a universal joint transmission by links that has revealed relatively expensive and complicated to manufacture, while nevertheless transmitting to the handlebar the sudden reactions due to the displacements of the suspension. Another solution consists in interlocking at least for translational motion the end of the movable rod to the handlebar and in interlocking for rotational motion through a sliding connection this rod to the telescopic suspension block body, this body being rigidly fixed to the single suspension arm. This apparently satisfactory solution has revealed in practice to be very difficult to carry out since there exists no telescopic suspension and shock-absorbing block the rod of which is interlocked in rotational motion with the block body; indeed, such an arrangement would require a sleeve integral with the rod and surrounds the block body while being coupled thereto for rotational motion by grooves, so as not to disturb the hydraulic liquid sealing means of the shock absorber.

One particular object of the present invention is to propose a device comprising a single lateral suspension arm and steering control means adapted to this Mac Pherson type suspension, which are a simple in design, do not transmit stray reactions to the handlebar while allowing to use for the constructing suspension and shock-absorbing block commercially available elements of which the reliability and economy are well established.

With this purpose in view, the suspension spring and/or shock absorbing block is a helical spring of which at least one of the end bearing planes comprises a low friction abutment allowing the spring to rotate freely about its longitudinal axis during its displacemetns and the steering control means is constituted by a handlebar or wheel rotatively mounted on a vertical axis of the said peak rotatively mounted on an axis substantially perpendicular to the median plane of the front wheel, i.e. to the steering plane, at the upper end of at least one upper link inclined towards the front of the motorcycle from its upper end and the lower end of which is also mounted on the lateral arm or support arm for rotation about an axis substantially perpendicular to the said steering plane at the upper end of at least one lower link inclined towards the front of the motorcycle from its lower end which is rotationally connected to an axis substantially perpendicular to the said steering plane, so that the upper and lower links connected in rotation respectively to the handlebar and to the support arm are pivotally interconnected in a scissor-like manner during the displacements of the front wheel suspension of the motorcycle.

According to the most current embodiment, the upper link and the lower link present substantially the same length and their respective median lines each form, in maximal extension position of the suspension block, an angle of about 30° with the longitudinal axis of this suspension block.

The upper link and the lower link can present substantially different lengths and their respective median lines thus form, in maximal extension position of the suspension block, an angle smaller than 30° with the longitudinal axis of this suspension block. The upper link can also present a length substantially smaller than that of the lower link so as to increase the distance between the front wheel and the axis of articulation interconnecting between the two links. The axis of articulation of the upper link is preferably substantially coaxial to the axis of articulation of the external movable rod of the suspension and shock absorbing block on the front peak of the chassis of the motorcycle.

According to another very compact embodiment of the invention, the upper link presents, on its upper part, a fork with two legs, each of which is rotationally connected to a boss of an arm of the handlebar and has at its lower part, a single central bearing through which extends a pin or assembly shaft and which is disposed between two bearings that are also crossed through by the assembling pin and which are both provided at each of the ends of the legs of a fork of the lower link, two lower legs of which extend therefrom are rotationally connected each to a corresponding boss provided on the support arm. The corresponding upper and lower links present the general form of a trapezium the large base of which is articulated respectively to the handlebar and to the support arm of the front wheel, and the small bases of which are joined to each other in the zone crossed through by the assembly pin and are articulated or hinged to each other.

According to another embodiment of the invention, the rotation connection of the upper end of the upper link and that of the lower end of the lower link are located beyond the bearing planes of the ends of a helical spring constituting the suspension spring of the suspension block. The steering links thus constitute supplementary guiding means of the suspension block during its displacements.

BRIEF DESCRIPTION OF THE DRAWINGS

Other aims, objects and advantages of the invention will become apparent from the following description of an embodiment, given by way of non-limitative illustration with reference to the appended drawings in which:

FIG. 3 is a longitudinal view on a smaller scale of a motorcycle corresponding substantially to that of FIG. 1 but fitted with another type of steering control means.

FIG. 4 is a side view of the suspension and steering control device according to the invention represented in its two extreme positions, i.e. fully extended and fully compressed, respectively, a major portion of the wheel of the motorcycle being torn away for enhanced clarity;

FIG. 5 is a cross-sectional view taken in plane II—II of FIG. 4, representing the steering control device as viewed towards the front, according to a cross-sectional plane passing through the articulation between the two links, and another cross-sectional plane passing through the wheel transversally via its axle and outside the brake disk yoke;

FIG. 6 is a side view, fairings removed, of a motorcycle utilizing a suspension and steering control device according to the invention, but slightly modified with respect to that of FIGS. 4 and 5.

DESCRIPTION OF THE PREFERRED EMBODIMENT

Figure 1:
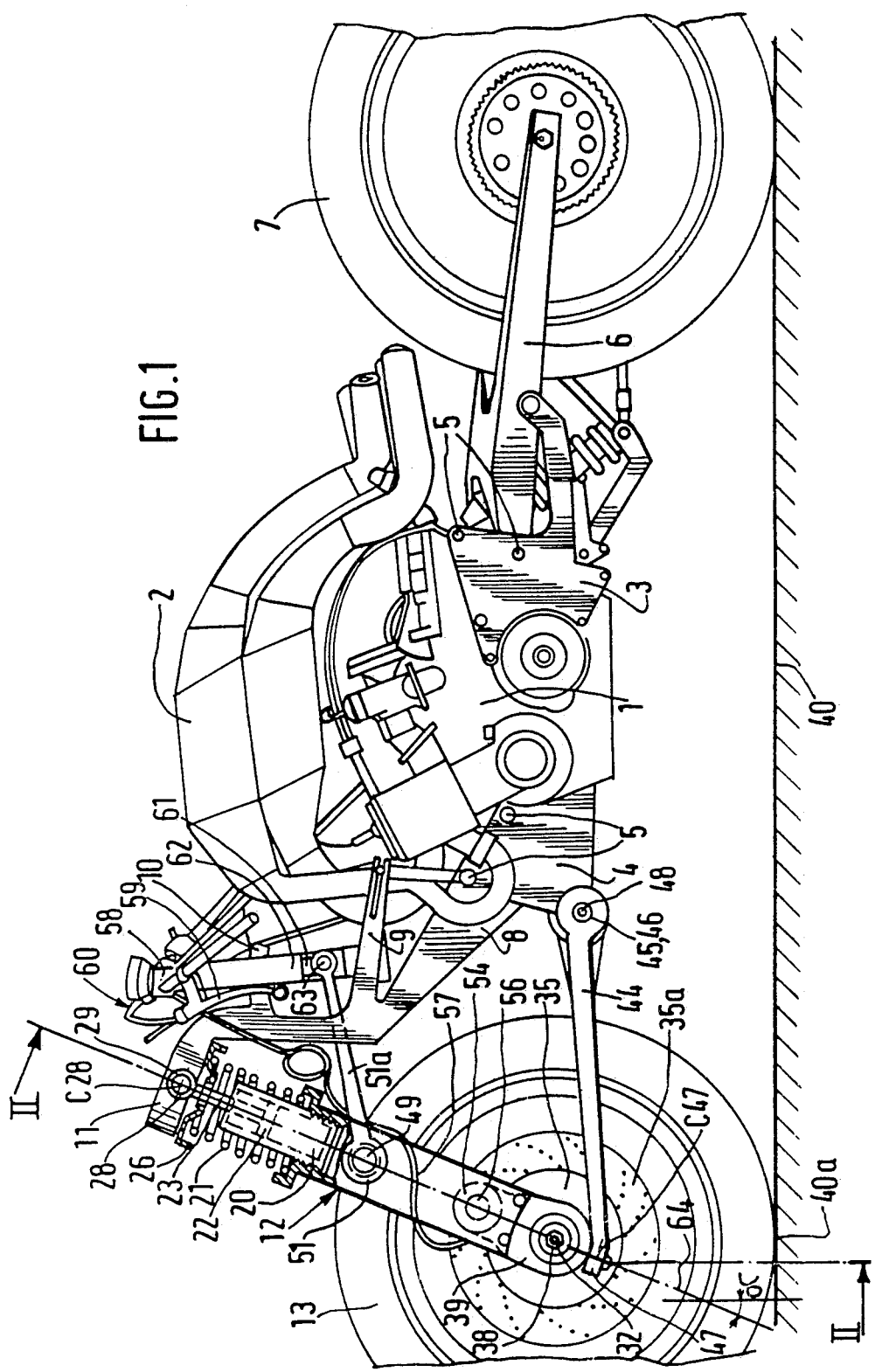
FIG. 1 is a schematic longitudinal view of a motorcycle fitted with a front suspension according to the invention, with torn-off end portions, and the casing, fuel tank and the saddle removed.

The motorcycle represented in FIG. 1 is fitted with means that are common to almost all motorcycles and which will only be mentioned, such as the motor block 1 with its exhaust system 2 at the top part, the chassis constituted by a rear support 3 and a front support 4 connected through the intermediary of motor block 1 on which they are secured by screws 5. A rear suspension arm 6 is articulated on the rear support 3 and carries the rear wheel 7. The front support 4 is extended towards the front by a cradle 8 which is connected by arms 9 and 10 to the motor block 1 and which terminates towards the front by a strut in the form of a peak 11 adapted to transmit the front load of the chassis onto the front suspension assembly of the motorcycle, which assembly will now be described.

Figure 2:
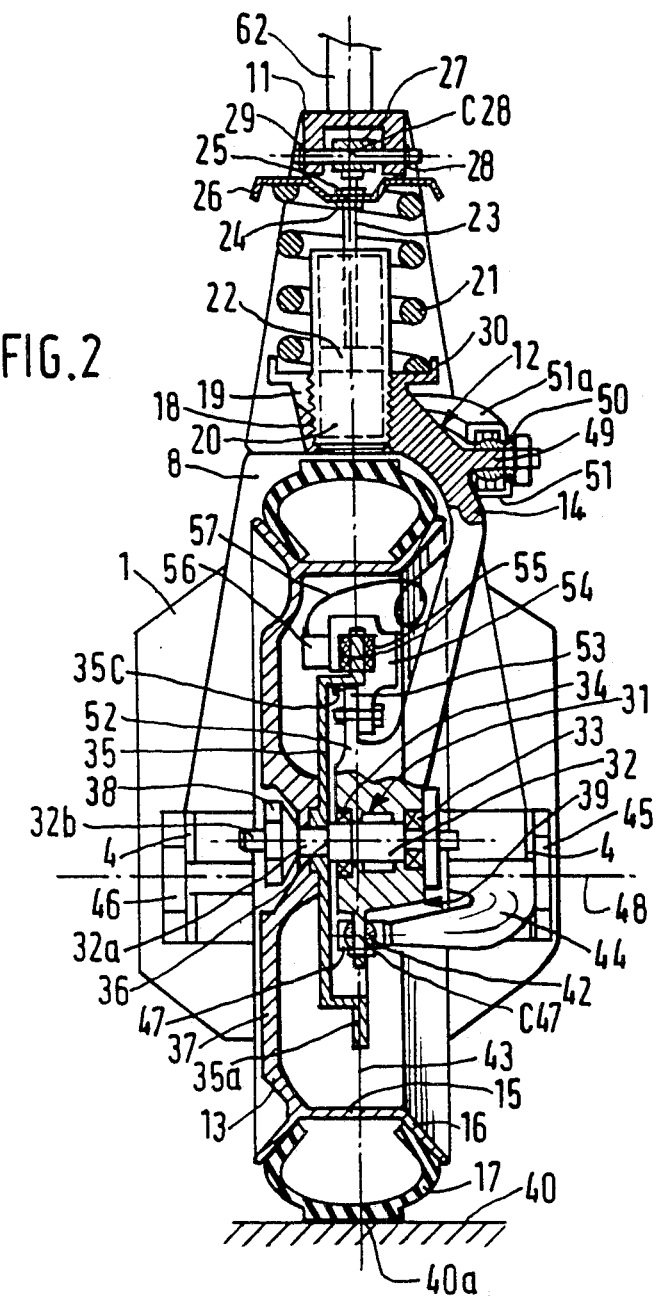
FIG. 2 is a cross-section along the line II—II of FIG. 1.

The single arm 12 provided for supporting the front wheel 13 is represented in cross-section on FIG. 2 and in side view in FIG. 1. It comprises a C-shaped part and which encases the wheel section and extends obliquely underneath the wheel rim heel 15, then about one of the V-shaped edges 16 of the wheel rim and then surrounds with a small clearance of the outside of the tire 17. Above the tire 17, the bent C-shaped part 14 presents a bore 18 which rigidly and preferably adjustably receives by any appropriate means, especially such as represented by a threading tightened by a split collar 19, the cylindrical body 20 of a telescopic block surrounded by a suspension spring 21 and comprising a hydraulic shock absorbing piston 22 of which the piston rod 23 is connected to the peak of the chassis.

The piston rod 23 is rendered adjustably integral, for example by a set of two adjusting screws 24 and 25, with a bearing plate 26 of the helical spring 21 and is screwed into an articulation head 27 which presents a bore through which extends an articulation rod 28 connected to the peak 11 of the chassis. Rod 28 crosses for example two opposing borings provided in the edges of the peak 11 where it is maintained in place by resilient washers 29 while articulation head 27 can rotate freely about the rod 28. When the length of the helical suspension spring 21 compressed between the upper plate 26 and a lower bearing cup 30 formed at the upper end of the bent part varies, the rod 23 thus remains in the axis of the cylindrical body 20 without being subjected to bending stresses, due to the rotation of the head 27 with respect to the rod 28 and/or this rod 28 with respect to the peak 11.

The lower bearing cup 30 can be rendered integral with the shock absorbing body 20, independently from arm 12 and may be adjustable, which allows where necessary to easily modify the support of the motorcycle on the ground. This support characteristic can be modified, in the embodiment represented in FIG. 2, by displacing the adjusting screws 24 or 25, or by displacing the body 20 in the bore 18 when the cup 30 is secured on this body.

The connection between the rod 23 and the peak 11 can be achieved simply by a semi-resilient attachment by means of an anti-noise elastomer block which does not provide the same geometric guiding perfection as the version represented in FIG. 2, but which is sufficient in current applications. This elastomer block connection can be oriented in any steering, provided the angular displacements are limited.

As an alternative, the cup 26 can be rendered integral with the peak 11.

The single arm 12 presents on its lower part a bore 31 which receives the axle 32 of the front wheel 13 and which is guided in rotation by strong ball or roller bearings 33 and 34, possibly replaced by a suitable single bearing, for example with oblique rolling contact. On the side of the wheel 13, the axle 32 is extended by a grooved part 32a on which are successively engaged the brake disk 35 in abutment on a shoulder 36 of the axle 32 and the flange or web 37 of the wheel 13, preferably made of a light alloy, the flange 37 being applied in abutment on the brake disk 35 by a blocking nut 38 screwed onto the end of the threaded part 32b of the axle 32.

The axle part or lower part 39 of the single arm 12 is extended in the direction of the rolling path 40 of the motorcycle by an integral or assembled articulation rod on which is mounted a ball and socket 42. The axis of the rod C47 is substantially coaxial to the steering axis 64 of the motorcycle which coincides with that of the rod 23 and is always located in the median plane 43 of the motorcycle. A lower steering or connecting arm 44 (cf. FIG. 1) hinged at 45 and 46 on the front support 4 of the engine block is movable in rotation about an axis 48 substantially perpendicular to the median plane 43 of the motorcycle, coinciding directly with the median plane of the front wheel 13, and is connected by a female ball and socket articulation member 47 to the ball and socket 42 in such a way that the center of rotation 47 of the female ball and socket is located on the axis of the rod C47 and thus in the median plane 43 of the motorcycle, which also constitutes the rotational displacement plane of the female ball and socket during rotation of the lower guiding arm 44 when the latter is displaced about axis 48 of its articulation 45 and 46.

In the embodiment represented the bent part hinges 14 which is the most eccentric part with respect to the median plane 43 of the wheel 13 comprises, substantially at the level of the high part of the tire 17, is an articulation rod 49 which carries a male annular ball and socket joint member or ring 50 on which is mounted the female ball and socket joint member 51 of a steering link 51a. The steering control is carried out by a substantially vertical steering rod 61 guided in a steering 62 provided with a lateral slot through which extends the end of the link 51a which is laterally hinged on a rod 61 by a lateral axle 63.

The various ball and socket articulations or joints which are cited above, especially the ball and socket articulation 42, 47 can be produced in a more simple, but more costly manner, by using ball and socket joints of the type used in the aeronautical industry where the ball and socket joint ring is produced as a single piece with the ball and socket joint axis is confined in the female ring member through deformation of the edges of the external ball and socket cage, the two elements, male and female, of the ball and socket joint being mounted onto the ends of the connecting pieces adapted to perform a relative ball and socket movement about the common center of rotation. The guiding arm 44 can advantageously present a section having a particular form, for example a C or an H, ensuring a considerable rigidity in all directions of load applied thereto and allowing it to withstand the different efforts transmitted by the wheel axle.

Inside the cup 35c of the brake disk 35 of which the active part 35a is substantially centered on the median axis 43 of the wheel 13, the axle part 39 of the arm 12 presents towards the top an extension 52 in the general form of a tongue 53 on which is secured, generally by screws, at least one brake disk yoke 54 or caliber of which the brake linings 55 surround the active part 35a of the brake disk 35 and of which the brake cylinder(s) 56 are connected by a partially flexible channel 57 to a hydraulic pressure source 58 generally controlled by a braking handle 59 articulated on the handlebar 60 of the motorcycle.

The tongue 53 is generally disposed laterally with respect to the plane of the section of FIG. 2 and a single tongue, supporting, on either side an attaching lug 54, can be used.

The working of the front suspension and of the steering means of the motorcycle represented on FIGS. 1 and 2 will now be described. During running, when the front wheel 13 runs on a bump, the engine block 1 must the lowered with respect to be bearing zone 40a of the front wheel 13 on the rolling path 40 which is raised by the roughness. The arm 44 thus turns about its axis of articulation 48 substantially perpendicular to the median plane 43 of the front wheel 13 and is displaced in rotation in a series of planes parallel to this median plane 43, so that the female elemetn of the ball and socket joint 47 of which the center of articulation is located on the median plane 43 of the wheel, does not receive a lateral force acting under the effect of the relative rotation of the arm 44 with respect to the front support 4 of the motor 1 block. Under the effect of the rotation of the arm 44 with respect to the front support 4, the single arm 12 moves towards the peak 11 by causing the helical spring 21 and displacing the piston 22 inside the bore of the body 20 of the telescopic block, so as to dampen the compression of the suspension. The single support arm 12 of the wheel is thus perfectly free to move in accordance with the more or less great compression of the front suspension. During displacement of arm 12 with respect to the peak 11, the inclination of the pivoting axis 64 of this arm 12 (cf. FIG. 1 where this axis coincides substantially—apart from the bending motions of this arm 12—with the axis of the rod 23 varies slightly without having any consequences on the road holding properties of the motorcycle).

The geometry of the assembly must be such that the axis of articulation 63 of the link 51a is substantially at the center of the camber of the path along which travels the center of the ball and socket joint 49, 50 during the movements described herein-above so that for example on a straight road when the vehicle passes over a bump or a hole, the link 51 a tends not to deviate laterally the wheel by tending to separate the ball and socket joint 49, 50 from the geometric path which is imposed by the action of the spring/shock absorber assembly 21, 22.

When the rider turns the handlebar 60, for example, to enter a bend, the steering link 51 exerts a transversal force on the rod 49 which causes the single arm 12 to turn about the axis of pivoting 64 which passes through the center of articulation C47 of the female ball and socket joint and substantially by the median point C28 of the rod 28 on which is articulated the head 27 of the rod 23. The rotation of the wheel 13 to steer the vehicle does not generate any substantially reaction on the arm 44 due to the fact that the axis of pivoting 64 passes through the center of pivoting C47 of the ball and socket articulation 42, 47 and on the other hand, the arm 44 and the single lateral wheel supporting arm 12 does not exert on cornering, any abnormal reaction on the steering link 51a, it being well understood that during cornering, the most decisive action on the steering of the motorcycle is in general not exerted by the handlebar 60 but by the inclination of the rider plus motorcycle assembly this inclination being initiated by the active control of the rider.

Apart from the mechanical control considerations of the steering and free displacement of the suspension, it can be noted that this novel type of suspension and steering associated to a motorcycle wheel ensures remarkable behavior with respect to the horizontal efforts acting on the front wheel 13 and which are withstood by the horizontal arm 44 with a minimum of bending of the single arm 12 while allowing to achieve an excellent esthetic aspect of the vehicle despite the lack of symmetry of the connection inherent in this method of mounting the front wheel.

Removal of the front wheel 13 becomes very easy in the embodiment according to the invention since this wheel can be removed immediately after unscrewing nut 38. According to another aspect which is appreciable in competition, the brake disk 35 can be removed and changed very rapidly, since for the removal of the wheel 13, it is sufficient to swing the yoke(s) of the brake 54 to be able to laterally withdraw the brake disk 35. In the preferred embodiment of the invention, for attaching the brake yoke, said yoke despite its position inside the brake 35c and concealed by the wheel rim heel 15, is swept by the air stream generated by the displacement of the motorcycle since the air is deflected by the bent part 14 in the direction towards the lug 54 during said displacement of the motorcycle.

In one embodiment represented in FIG. 3, the steering control means per se are simplified as much as possible. The rod 23 is extended towards the top and crosses through the peak 11 while passing through the abutment and guiding bearings 65 resting on this peak 11 and is connected by any adequate means, such as flanging or wedging to the handle bar 60 of the motorcycle. In order to rotate the single arm 12, it is necessary to rotatively connect the rod 23 and the body 20 of the telescopic block, preferably without disturbing the hydraulic sealings of the shock absorbing function exerted by the piston 22. With this purpose, it is possible to mount about the protruding part of rod 23 outside the body 20 a rotation guiding block 66 presenting a grooved bore of which the hollow grooves are engaged by protruding splines provided on the rod 23 in a zone where this rod does not penetrate into the body 20.

In the embodiment of FIG. 3, steering control by means of a lateral link is obviously suppressed and it can be seen that the handlebar 60 is located further to the front than in the embodiment of FIG. 1, which presents certain kinetic and esthetic advantages. The resistance to longitudinal forces being in any case ensured by the arm 44.

It should also be noted in this embodiment of FIG. 3 that the axle 32 of the front wheel 13 is shifted slightly towards the front with respect to the steering axle of the front wheel 13, so as to achieve an offset structure which improves the road holding of the motorcycle as well as the steering stability by increasing the urge of return towards the straight line travel. This arrangement can also be applied to the embodiment represented in FIGS. 1 and 2, while the pivoting center C47 of the connecting arm 44 still passes through the median plane 43 of the vehicle and of the front wheel 13 in straight line position of the vehicle.

The axis of articulation 48 of the arm 44 can be disposed on the front support 4 at different heights with respect to the rolling path 40 so as to modify the inclination of the arm 44 in order to influence the suspension on the rake variation curve and the counter-diving effect during braking.

It is possible furthermore to dispose the ball and socket connection having its center at C47 above the wheel axle while maintaining it in the alignment of the steering axis 64. In order to carry out such an arrangement, it is necessary to provide in the axle part 39 of the lateral arm 12, a cavity allowing to house the ball and socket articulation with center C47. According to another variant, the center ball and socket articulation with center C47 can surround the wheel hub which thus crosses the ball and socket joint at the end of the arm 44. This solution allows to utilize a ball and socket joint having a larger diameter and especially a multi-sphere ball and socket joint, the axle of the front wheel 13 thus passing through the ball and socket center C47.

The efficient length of the arm 44 can be rendered adjustable in a small displacement range in length by securing the support of the ball and socket piece 47 (male or female according to the case) at the end of this arm in an easily adjustable way, especially through rotation of an intermediary piece. This arrangement allows to cause to vary the angle called "rake" angle alpha (cf. FIG. 1) of the lateral arm 12 acting as a fork with respect to the vertical and thus to adapt the steering characteristics (return, stability in straight line, halting or stopping torque), in function of the utilization envisaged for the motorcycle. The connection between the ball and socket support piece and the lower guiding arm 44 can be a sliding connection controlled by a jack, especially by a hydraulic jack, of which the stroke is servo-controlled by a parameter of the motorcycle, especially its speed, so as to cause to vary the rake angle alpha of the front wheel 13 as a function of the speed of the motorcycle in order to stiffen steering at high speed and render it more flexible at lower speed. The hydraulic jack can, for this purpose, act against a positioning spring and be actuated against a spring at a pressure that much higher with the increasing speed of the motorcycle.

According to a particularly simple and advantageous embodiment of the invention, the helical suspension spring 21 bears in an off-centered manner on the upper plate 26 or on the lower cup 30, i.e. the plate 26 and/or the cup 30 are off-centered in the median plane 43 of the motorcycle with respect to the steering axis 64 coinciding with the axis of the telescopic block 20 body and the axis of the piston rod 23. During rotation of the front wheel 13, the suspension spring 21 thus exerts a torque upon the cup 30 and the arm 12 which tends to bring the wheel to the straight line position. The off-centering of the spring 21 can be obtained in a more compact way by using a helical spring having a generally frustoconical form the base of which presents, for example, a diameter greater than that of the apex end and is off-centered towards the front with respect to the axis of the body 20.

FIGS. 4 and 5 show that the front wheel 101 of the motorcycle is rendered integral with a wheel rod 102 which is carried by a single support arm 103 through the intermediary of rollers 104 and 105. The support arm 103 which presents transversally a cambered form laterally surrounding the peripheral part of the wheel 101 and of the tire 106 of this wheel is connected to a front peak 107 of the chassis of the motor cycle through the intermediary of a suspension and shock absorbing block 108 constituted by a shock absorbing body 109 with an external rod 110, surrounded by a suspension helical spring 111. External rod 110 is pivotally mounted on front peak 107 by two bearings 112 (which could be replaced in a less elaborate version by a silent block type elastomer connection) authorizing the variations of inclination of the support arm 103. The rod 110 is integral at one end and at the inside of the cylinder of the shock absorber body 109 with a shock absorber piston (not represented) and at its other end, with a sleeve 113 which carries the bearings 112 and on which rests through the intermediary of a lower friction stop or abutment member 114 (for example of the needle type) and of a cup 115, the upper end of the helical suspension spring 111. The shock absorber body 109 is fixed, by clamping its lower part by means of a flange 116, to the upper part of the support arm 103 and is surrounded by a bearing cup 117 of the lower end of the spring 111 which bears on the arm 103; this cup 117 may also comprise a lower friction abutment. In a conventional way, the support arm 103 carries a brake disk yoke 118 into which extends, in the zone of the brake linings 118a, a brake disk 119 integral with the wheel 101 and with the rod 102 of the front wheel, this arm 103 being connected by a lower guiding arm 120 to the engine block of the motorcycle. For esthetic reasons and for protection against external attacks, the suspension spring 111 can be housed completely inside the shock absorbing body 109, in the same way as in the conventional construction of telescopic forks of motorcycles.

It one particular object of the present invention especially to connect the handlebar with two arms 121 to the support arm 103, so as to enable this support arm 103 to rotate in synchronism with the handlebar 121 whatever the position of the rod 110 and the degree of compression of the front suspension spring 111 of the motorcycle. For this purpose the invention provides an upper link pivotally connected at its upper end, at 123 by bearings 123a and 123b, to bosses 124a and 124b of a ring member 125 holding the right and left tubes of the handlebar 121. Ring member 125 is rotationally mounted by bearings 125a vertically on the peak 107. The link 121 has an upper fork with two legs 122a and 122b and a single bearing lower connection 126 crossed through by an assembly pin 127 and disposed between two bearings 128a, 128b of a lower link 129. The upper link 122 is inclined towards the front of the motorcycle from its upper end while the lower link 129 is fowardly inclined from its lower end which has two legs 129a and 129b, so that the scissor-wise articulation of these two links assumes a V-shape pointed towards the front of the motorcycle. The lower link 129 is pivotally connected by its two lower legs 129a and 129b, and by bearings 130a and 130b, respectively to bosses 131 and 132 provided on the support arm 103 substantially at the level of the flange 116.

FIG. 4 represents in mixed lines (the displaced elements being designated by a prime index) the position of the links 122 and 129 (referenced 122' and 129') when the suspension of the front wheel of the motorcycle is extended to a maximum, which corresponds to the representation of FIG. 4 while the full lines show the position of these links when said suspension is compressed to a maximum. It will be noted on FIG. 5 that the upper and lower links 122, 129 have substantially the same length and that the angle alpha formed by their respective median lines with the longitudinal axis 133 of the suspension block 108 in maximum extension position of this suspension block is about 30°, the obtuse angle beta of the V formed by the two links being about 120°. In the position of maximum compression of the front wheel suspension, in which the links 122 and 129 are represented by full lines on FIG. 5, the angle alpha is close to 60°, which is also the value of the sharp angle beta between the two links. The lower link 129 comprises at each end a fork with two legs but the two links 122 and 129 both present the general form of a trapezium the great base of which being pivotally connected respectively to the handlebar 121 (high link 111) and to the wheel support arm 103 (low link 129) and while the small bases are joined to each other in the zone crossed through by the assembly pin 127 and are pivotally (rotationally) connected to each other so as to allow to transmit torque from the handlebar 121 to the support arm 103 and the wheel 101.

The links two-legged 122 and 129 could be each replaced by two separated rods pivotally connected with respect to each other on a rod replacing the pin 127. It will be noted that the bearings interconnecting the upper end of link 122 and the lower end of link 129 are located beyond the bearing planes of the respective ends of the suspension spring 111. These bearing planes of the spring 111 are constituted by bearing 113 and cup 117 which can also be provided with a low friction abutment member. The handlebar 121 with two arms can also be constituted by a continuous handlebar gripped by a clamping piece in front or to the rear of the articulation or pivoting axis 123 of the upper link 122. This disposition allows to adapt the handlebar 121 to the morphology of the pilot of the motorcycle.

The operating mode of the steering control device that is explained herein-above with respect to FIGS. 4 and 5 is easy to understand. When the rider of the motorcycle turns the handlebar 121, the arms 122a and 122b of the upper link 122 are rotated by bosses 124a and 124b and will rotate pin 127 that crosses through the single bearing surface 126. Bearings 128a and 128b of the lower rod are rotated by the pin 127 and thus rotate by the same angle the lower link 129 and the arm 103 that holds the axis 102 of the wheel 101 substantially in the steering controlled by the handlebar 121, the slight difference between the rotation of the handlebar 121 and that of t he wheel 101 being mainly due to the flexional and/or torsional deformation of the links and to the "drag" reaction of the tyre 106 on its running path 134. When the front suspension of the motorcycle is displaced by compression or extension of the spring 111, the links 122 and 129 turn scissor-like with respect to one another about the pivoting axis constituted by the pin 127 and their other rotative connections 123 and 130, thereby varying angles alpha and beta in opposite direction, without the transmission of the torque between the handlebar 121 and the support arm 103 being affected. It will also be noted that the higher the load applied by the front peak 107 of the chassis on the wheel 101, especially in the case of braking, greater the trend of pin 127 tends to be move away from the wheel 101, which facilitates control by the handlebar 121 of the reactions issuing from the wheel 101, specifically at the moment that these reactions are maximal due to the transfer of the load onto the front wheel.

FIG. 6 illustrates an alternative version of the steering control device according to the invention, representing on a smaller scale the main elements of the motorcycle assembly. The pieces and parts identical to those of FIGS. 4 and 5 bear the same reference numerals and will not be explained again. Among the elements that have not yet been explained, are the motor-transmission block 135 and its front and rear support plates 136 and 137 respectively, connected to the front chassis of the motorcycle which carries the peak 107 with the reinforcing and connecting bars connected to the motor block 135, the upper exhaust pipes 140 the rear wheel 141 and its suspension arm 143 as well as the lower articulated connection of the guiding arm 120 connected to the lower part of the support arm 103 underneath the wheel rod 102 (also represented in cross-section in FIG. 5).

In the embodiment according to FIG. 6, handlebar 121 comprises a vertical tube 143 integral with the ring member 125 rotationally mounted in on the peak 107. The handlebar 121 can thus be placed in a position substantially higher than the upper end of the link 122, which allows to improve the position of the motorcycle rider, in particular in the case of tourist motorcycles.

When the motorcycle represented in FIG. 6 runs on its running path 134, the rotation of the handlebar 121 causes to turn the tube 143 and the ring member 125 so as to rotate links 122 and 123 through their respective articulations 123, 127 and 130 (cf. FIGS. 4 and 5) thus, consequently rotating the support arm 103 of wheel 101. Any compression of the suspension spring 111 causes the V-shaped structure formed by the links to narrow and thus reduces the angle beta formed between these two links without interrupting the connection transmitting the torques between the ring member 125 and the support arm 103 of the front wheel 101. It will be noted from FIG. 6 that links 122 and 129 do not impair the general esthetics of the motorcycle and are totally independent from the suspension and shock absorber block 108 which can thus be selected so as to produce the best compromise between suspension and shock absorbing performances and availability and cost requirements.

The present invention is in no way limited to the embodiments described and represented herein, and may be modified in many ways by those skilled in the art without departing from the scope and spirit of the invention.

I claim:

1. A front suspension device for a front wheel of a motorcycle, said front wheel mounted on an axle about a rotational axis and said motorcycle having a longitudinal plane and a chassis with a front peak, said front suspension device comprising:

support arm means for laterally supporting the front wheel and for rotationally steering the front wheel about a steering axis substantially orthogonal to the rotational axis of the front wheel, said steering axis being located substantially centrally in the longitudinal plane of the motorcycle, said support arm means including an upper portion and a C-shaped bent lower portion encasing a portion of the front wheel;

a telescopic block secured between the upper portion of said support arm means and the front peak, said telescopic block including a suspension spring, a shock absorber and a plate at the upper end of the shock absorber, the suspension spring abutting the plate and the shock absorber having a telescopic cylinder connected with the upper portion of the support arm means and a movable rod substantially in alignment with the steering axis and pivoted at its upper end to the front peak of the chassis such that the upper portion of the support arm means is connected to the front peak by means of the movable rod and the upper end of the suspension spring;

a lower connecting arm having one end connected to the lower portion of the support arm means by a ball and socket joint having a pivoting center located substantially in alignment with the steering axis and having an opposite end rotatably mounted along an axis of the chassis substantially perpendicular to the median plane of the motorcycle;

wherein said support arm means is connected to the chassis by a movable suspension linkage comprised of the connecting arm and the telescopic block.

2. A device according to claim 1, further comprising steering link means for turning the front wheel by rotation of the support arm means and the telescopic block, and wherein said C-shaped bent portion of the support arm means is connected by a ball and socket joint to the steering link means and the movable rod is rotatably connected with the front peak for posing a friction couple exerted by relative rotation of the telescopic cylinder with respect to the movable rod.

3. A device according to claim 2, wherein the steering link means includes an end in facing relation to the motorcycle, said steering link end including a pivoting axis disposed substantially at the pivoting center of the ball and socket joint which is connected with the steering link means, when the telescopic block is actuated.

4. A device according to claim 1, wherein the support arm means comprises an extension adjacent to the axis of the wheel and directed toward the rim of the front wheel and the telescopic block, and further comprising at least one brake disk yoke fixed on the extension and surrounding a brake disk intergral at least in rotation with the axle of the front wheel.

5. A device according to claim 1, further comprising a brake disk rotatably connected with said front wheel, and the axle of the front wheel is rotatably mounted on the support arm means by bearing and has grooved attachment means adapted to be rotatably connected to the front wheel hub, said grooved attachment means having a threaded extension portion which screwthreadedly receives a removable nut for permitting rapid changing of the front wheel and the brake disk after shifting of brake calipers which straddle the brake disk.

6. A device according to claim 1, further comprising a ball and socket joint support which cooperates with said ball and socket joint and said lower connecting arm, said ball and socket joint support including a second rod integral with the support arm means and extending in a rolling direction of the front wheel, said ball and socket joint support having an axis substantially in the median plane of the front wheel, said ball and socket joint support further including a ball means disposed on said second rod and hinged to a respective end of the lower connecting arm, at least the second rod and a portion of the ball means being housed inside a cup of a brake disk.

7. A device according to claim 1 wherein said movable rod of the telescopic cylinder is pivoted on the front peak of the chassis of the motorcycle through a connection rod having an axis which is orthogonal to the mean longitudinal plane of the motorcycle and which is carried by the front peak, said connection rod extending in a rotatable manner through a bore of a pivoting head which is secured to the movable rod of the telescopic cylinder.

8. A device according to claim 1, wherein said suspension spring has a generally cyclindrical cross-sectional configuration and a longitudinal axis which is substantially located in the longitudinal plane of the motorcycle and is positioned off center with respect to a central axis of the telescopic cylinder as a result of the configuration of at least one receiving place associated with the end of said suspension spring so as to apply a return torque to the support arm means toward a straight line position.

* * * * *